US009696540B2

(12) United States Patent
Moidu (10) Patent No.: US 9,696,540 B2
(45) Date of Patent: Jul. 4, 2017

(54) HIDDEN HINGE MEMS WITH TEMPORARY GIMBAL ANCHOR

(71) Applicant: Lumentum Operations LLC, Milpitas (CA)

(72) Inventor: Abdul Jaleel K. Moidu, Nepean (CA)

(73) Assignee: Lumentum Operations LLC, Milpitas, CA (US)

( * ) Notice: Subject to any disclaimer, the term of this patent is extended or adjusted under 35 U.S.C. 154(b) by 517 days.

(21) Appl. No.: 13/848,761

(22) Filed: Mar. 22, 2013

(65) Prior Publication Data

US 2014/0285871 A1    Sep. 25, 2014

(51) Int. Cl.
    G02B 26/08    (2006.01)
(52) U.S. Cl.
    CPC ..... *G02B 26/0841* (2013.01); *Y10T 29/49117* (2015.01)
(58) Field of Classification Search
    CPC .............. G02B 26/005; G02B 26/0833; G02B 2027/0178; G02B 26/02; G02B 26/0816; G02B 27/0172; G02B 2027/0138; G02B 26/001; G02B 26/007; G02B 27/0093; G02B 2027/0174; G02B 26/004; G02B 26/023; G02B 27/0103; G02B 1/06; G02F 1/01; G02F 1/017; G02F 1/19; G02F 1/21; G02F 1/155; G02F 1/29; G02F 2001/213; G02F 1/0102; G02F 1/015; G02F 1/157; G02F 1/163; G02F 1/167; G02F 1/0131; G02F 1/13306; G02F 1/1334; G02F 1/137; G02F 1/17; G02F 1/218

USPC ........ 359/245, 260-261, 263, 298, 301-303, 359/317-318, 290-292, 223, 225, 262, 359/295, 198
See application file for complete search history.

(56) References Cited

U.S. PATENT DOCUMENTS

| | | | |
|---|---|---|---|
| 5,535,047 A | 7/1996 | Hornbeck | 359/295 |
| 6,934,439 B2 | 8/2005 | Mala et al. | 385/18 |
| 6,968,101 B2 | 11/2005 | Miller et al. | |
| 7,010,188 B2 | 3/2006 | Miller et al. | |
| 7,616,372 B2 | 11/2009 | Miller et al. | 359/291 |
| 7,952,778 B2 | 5/2011 | Moidu et al. | 359/198.1 |
| 8,274,722 B2 | 9/2012 | Moidu | 359/224.1 |
| 2007/0001783 A1* | 1/2007 | Lutz et al. | 333/186 |
| 2010/0103494 A1* | 4/2010 | Moidu | 359/225.1 |
| 2011/0013256 A1 | 1/2011 | Uchiyama et al. | 359/290 |
| 2011/0140569 A1* | 6/2011 | Moidu | 310/300 |
| 2011/0149362 A1 | 6/2011 | Moidu | 359/226.1 |

\* cited by examiner

*Primary Examiner* — Scott J Sugarman
*Assistant Examiner* — Sharrief Broome
(74) *Attorney, Agent, or Firm* — Harrity & Harrity, LLP (57) ABSTRACT

Micro-electro-mechanical system (MEMS) mirror devices and manufacturing methods thereof. The device comprising a hinge layer having orthogonal tilt and roll hinges connecting inner and outer platforms such that the inner platform has bi-directional rotation. An electrode layer connected beneath the hinge layer controls rotation of the platforms. A mirror layer above the hinge layer comprises a mirror connected to the inner platform via a pedestal and fixed membrane connected to the hinge layer but detached from the mirror. An anchor temporarily reduces movement of the outer platform during fabrication. In a fabrication state, the anchor anchors the outer platform to the mirror layer's fixed membrane. In a post-fabrication state, a gap releases the outer platform.

20 Claims, 10 Drawing Sheets

HIDDEN HINGE MEMS WITH TEMPORARY GIMBAL ANCHOR

TECHNICAL FIELD

The present invention relates to micro-electro-mechanical systems (MEMS) mirrors and in particular to multi-layer stacked hidden-hinge MEMS mirrors using one or more gimbals in an intermediate layer to provide a high degree of freedom of movement of the mirror.

BACKGROUND OF THE INVENTION

MEMS mirror arrays provide an important switching engine for Wavelength Selective Switch (WSS) products. A hitless WSS requires a biaxial (tilt and roll) mirror array. Hidden hinge arrays, where the hinges are located underneath the mirror structure, are advantageous due to reduced chip size/cost, as well as improved performance, faster switching for instance. Future MEMS mirror arrays for wavelength selective switching call for relatively long and stiff or thick mirrors capable of tilting in two axes, and a relatively high tilt angle. Vertical comb drives provide relatively large electrostatic torque that is required for high tilt angle. Hidden hinges with vertical comb actuators are quite a powerful combination for next generation wavelength selective switches.

Piano-MEMS micro-mirrors, which tilt about two perpendicular axes and can be tightly packed together are disclosed in U.S. Pat. No. 6,934,439 issued Aug. 23, 2005 in the name of the present Applicant. A hidden hinge version of the piano-MEMS micro-mirrors is disclosed in U.S. Pat. No. 7,616,372 issued Apr. 4, 2007 in the name of the present Applicant. Further hidden hinge MEMS micro-mirror devices are described in U.S. Pat. No. 7,952,778 issued May 31, 2011 in the name of the present Applicant and U.S. Pat. No. 8,274,722 issued Sep. 25, 2012 in the name of the present Applicant. All four of these patents are incorporated herein by reference.

The aforementioned piano-MEMS devices pivot about a single centrally located post with the use of gimbals having torsional hinges. Generally speaking, a gimbal is a pivoted support that allows the rotation of an object about a single axis. A set of two gimbals, one mounted within the other, each with orthogonal pivot axes, may be used to provide an object mounted on the innermost gimbal two degrees of freedom of movement (e.g. tilt and roll).

When manufacturing multi-layer hidden-hinge MEMs mirrors, the hinge layer forms an intermediate layer of the MEMS so the mechanics, such as gimbals, hinges and other suspended structures, are hidden beneath the mirror. Because the hinge layer is an intermediate layer, it is very challenging to etch the hinge layer at the end of the fabrication processes. Common practice to avoid these challenges has been to etch the hinge layer mid-way through the fabrication process and complete construction of the MEMS device with freely moving gimbal platforms or other suspended structures. Accordingly, any manufacturing steps after forming the gimbals risk damaging the MEMS because of the mobility of these parts. Examples of possible damage to each MEMS mirror in the array include, interference or stiction with nearby structures during wet processing such as surface preparation prior to bonding, unintentional attachment to nearby structures during high temperature processes such as bond annealing, or failure of a hinge due to excess movement during the remaining manufacturing process.

When the hinge layer comprises one gimbal, in some embodiments the moveable platform is temporarily secured to the un-etched mirror layer's upper surface; however, the moveable platform may be of such an elongate size and shape that damage may still occur after etching the gimbal layer.

When the hinge layer comprises two gimbals, both the inner and outer platforms are free moving relative to the rest of the layer after the hinges have been etched. During fabrication, the outer platform may have a high freedom of movement in two degrees. Accordingly the risks of damage to the MEMS is increased.

Suspended structures, gimbal or otherwise, in an intermediate layer of the MEMS may result in damage during the fabrication process such as interference, failure of fragile hinges or fusion of the suspended structure to nearby structures.

SUMMARY OF THE INVENTION

According the present disclosure, the risk of damage to a MEMS device having suspended structures, such as gimbal platforms, within an intermediate layer can be reduced by introducing temporary anchors into the MEMS design. The temporary anchors can be temporarily anchored during fabrication to eliminate suspended structures or reduce the degree of freedom of movement of such structures, then released later in the fabrication process.

According to one aspect, a micro-electro-mechanical system (MEMS) device comprises: a hinge layer including a fixed membrane having roll hinges connected to an outer platform having tilt hinges connected to an inner platform, the tilt hinges defining an axis of tilt rotation orthogonal to an axis of roll rotation defined by the roll hinges such that the inner platform is provided two degrees of rotational freedom; an electrode layer, connected beneath the hinge layer, for receiving electrical control signals, the electrode layer comprising roll means for electrically biasing roll rotation of the outer platform and the inner platform and tilt means for electrically biasing tilt rotation of the inner platform; a mirror layer above the hinge layer comprising an outwardly extending mirror connected to the inner platform via a pedestal and a fixed membrane connected to the fixed membrane of the hinge layer but detached from the mirror; an anchor for temporarily reducing movement of the outer platform during fabrication, the anchor having a fabrication state where the anchor anchored the outer platform to the fixed membrane of the mirror layer and a post-fabrication state where a gap was defined to release the outer platform.

According to another aspect a method of manufacturing a micro-electro-mechanical system (MEMS) device comprises: (a) providing a mirror layer comprising a mirror temporarily connected to a fixed membrane; (b) providing a hinge layer comprising roll hinges defining a roll axis, an outer platform connected to the roll hinges, tilt hinges connected to the outer platform defining a tilt axis orthogonal to the roll axis, and an inner platform connected to the tilt hinges; (c) providing an electrode layer for receiving electrical control signals to control the rotation of the inner platform and the outer platform after fabrication; (d) after (a) and (b), connecting the hinge layer beneath the mirror layer including: (i) connecting a pedestal between the mirror and the inner platform to secure the inner platform during fabrication, and (ii) connecting an anchor between the fixed membrane and the outer platform to secure the outer platform during fabrication; (e) connecting the electrode layer beneath the hinge layer; (f) after (d) and (e), disconnecting the mirror from the fixed membrane for tilt rotation of the mirror via the inner platform; and (g) after (d) and (e), disconnecting the outer platform from the fixed membrane for roll rotation of mirror via the outer platform.

According to a further aspect, a micro-electro-mechanical system (MEMS) device comprises: a hinge layer suspended between a mirror layer and an electrode layer; the hinge layer comprising a hinge, defining an axis of rotation, and a platform connected to the hinge and rotatable about the axis via the hinge; the mirror layer comprising a mirror and a fixed membrane; a pedestal connecting the mirror to the platform; an anchor for temporarily reducing movement of the platform during fabrication, the anchor having a fabrication state where the anchor anchored the platform to the fixed membrane of the mirror layer and a post-fabrication state where a gap was defined to release the platform; and the electrode layer for receiving electrical signals to control rotation of the platform.

Where alternative embodiments and additional aspects of those embodiments are described in the present disclosure, these embodiments and aspects may be combined in any manner within a single embodiment unless the present disclosure suggests otherwise. While preferred embodiments may be illustrated or described herein, they are not intended to limit the invention. Rather, numerous changes including alternatives, modifications and equivalents may be made as would be understood by the person skilled in the art.

BRIEF DESCRIPTION OF THE DRAWINGS

The invention will be described in greater detail with reference to the accompanying drawings.

DETAILED DESCRIPTION

Figure 1A:
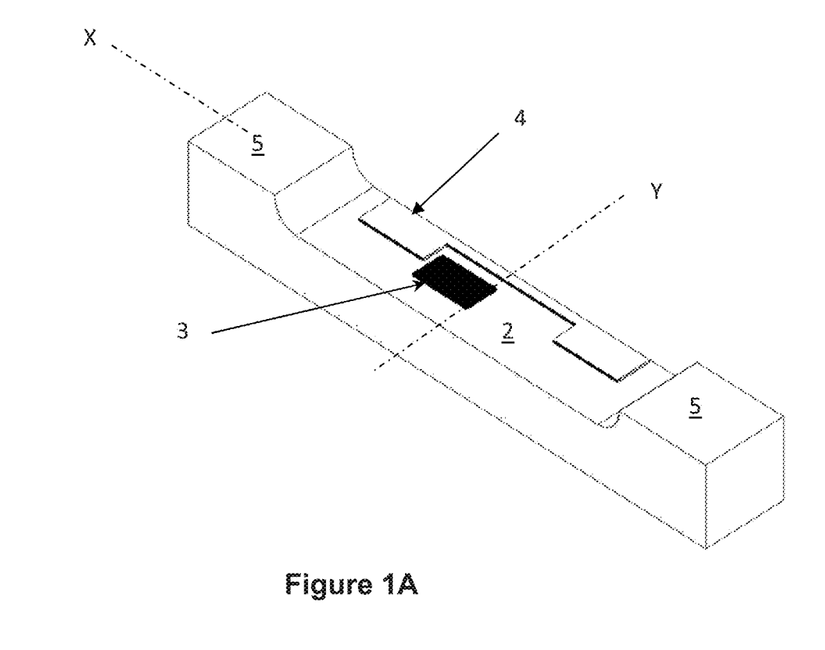
FIG. 1A is an isometric view of a prior art hidden-hinge bi-axial MEMS mirror device.
Figure 1B:
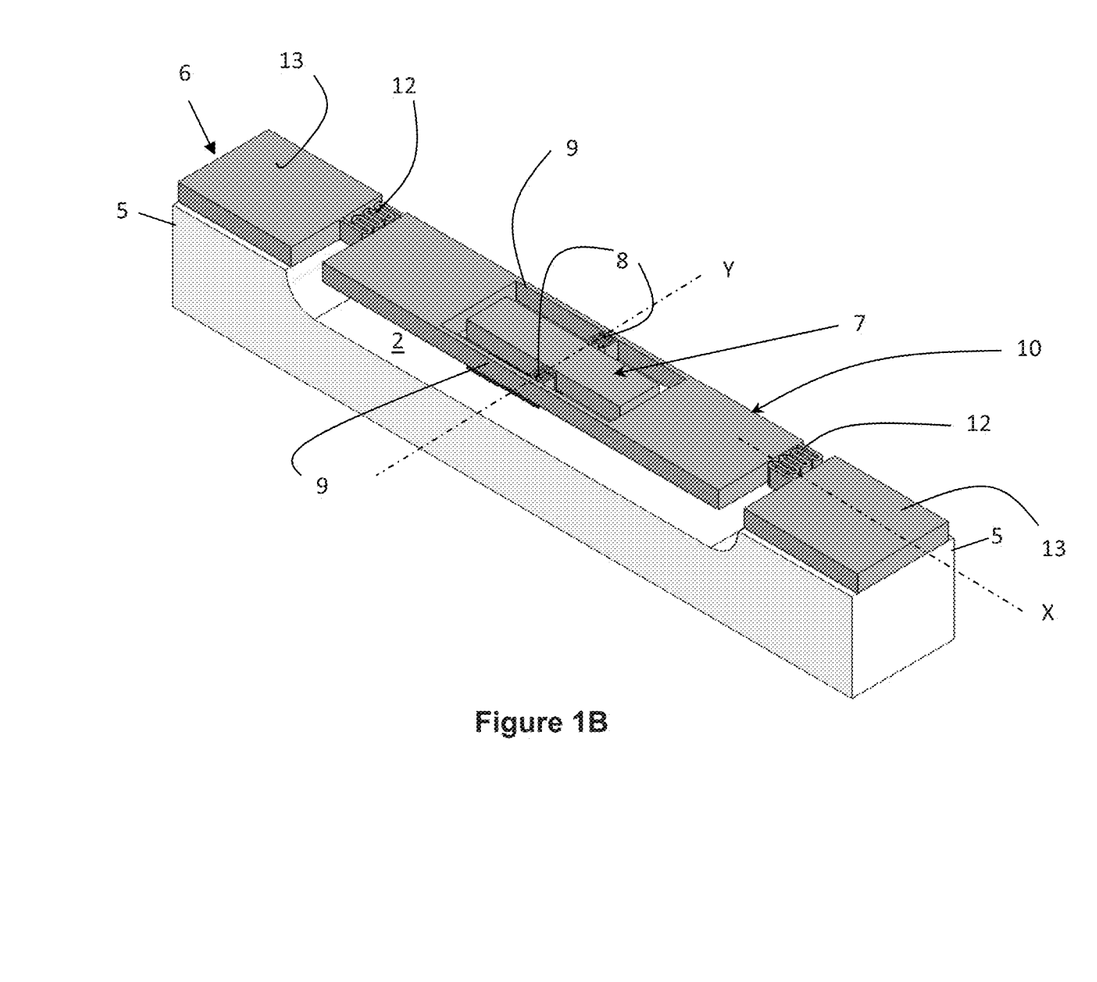
FIG. 1B is a top view of the device of FIG. 1A.
Figure 1C:
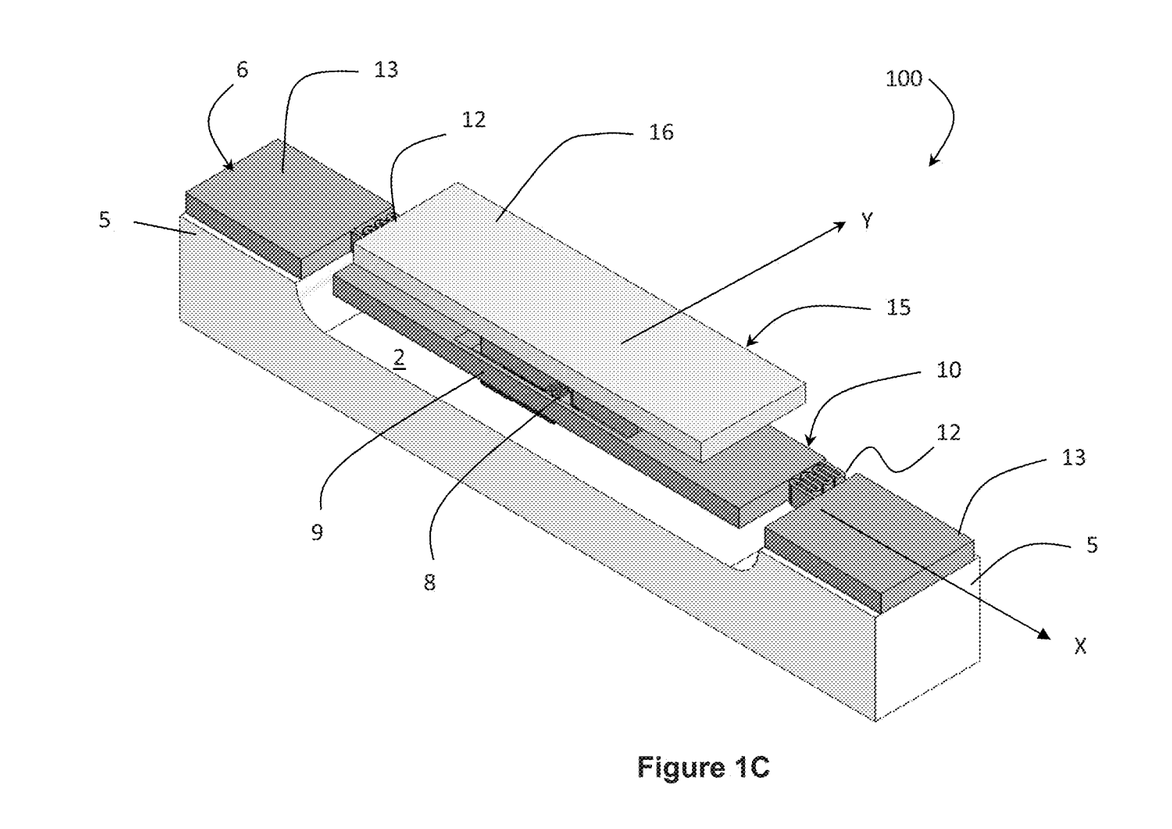
FIG. 1C is front view of the device of FIG. 1A.

FIGS. 1A-1C illustrate an existing design for a hidden hinge biaxial MEMS mirror 100. In FIG. 1A, the electrode layer 2 consists of one or two tilt (Y axis) electrodes 3 and one elongated roll (X axis) electrode 4 (having two interconnected segments as shown) applied to a support substrate 5. In FIG. 1B, a hinge layer 6 is applied above the electrode layer 2. A tiltable central platform 7 is suspended on tilt hinges 8 and connects via those hinges 8 to a movable gimbal ring 9. The ring 9 is suspended on roll hinges 12 which connect to support substrate 13 connected to support substrate 5 of the electrode layer 2. The tilt electrodes 3 are located underneath the distal ends of the central platform 7. The segments of the roll electrode 4 are located underneath the distal ends of the gimbal ring 9. In FIG. 1C, a mirror layer 15 is connected above the hinge layer 6. A central pedestal 18 (see FIG. 2A) connects a mirror 16 to the central platform 7. By design, only the central platform 7 connects to the mirror 16 (via the central pedestal 18) to permit the mirror biaxial movement in the X and Y axes. If other structures were connected to the mirror 16, the mirror 16 would be over-constrained or immovable. The structure comprising the central tilt platform 7, central pedestal and the mirror 16 tilts about the Y axis when a voltage is applied to the tilt electrode(s) 3, and the same structure plus the outer gimbal ring 8 rolls about the X axis when a voltage is applied on the roll electrode 4. All these structures are hidden underneath the mirror 16. An array of micro-mirrors is formed by repeating the whole structure 100 along the width as specified by optical design.

Figure 2A:
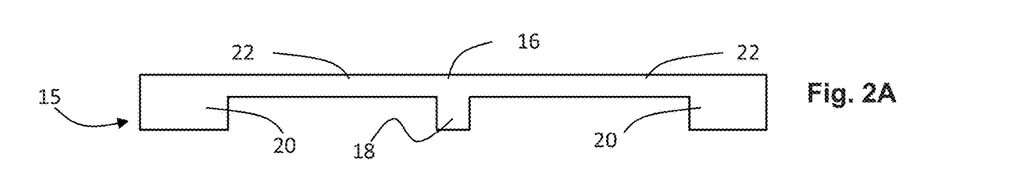
FIGS. 2A-2E are cross-sectional front views of the device of FIG. 1A at different stages of fabrication where the cross-section is taken along the roll axis.
Figure 2B:
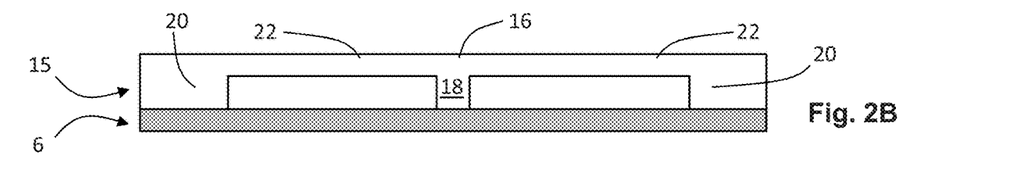
Figure 2C:
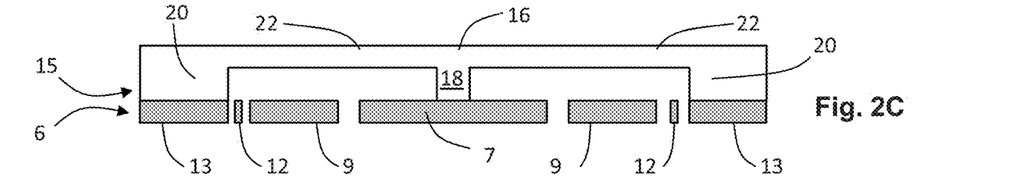
Figure 2D:
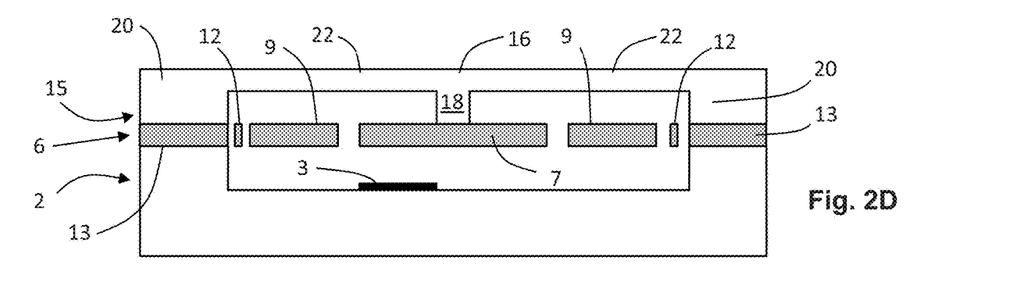
Figure 2E:
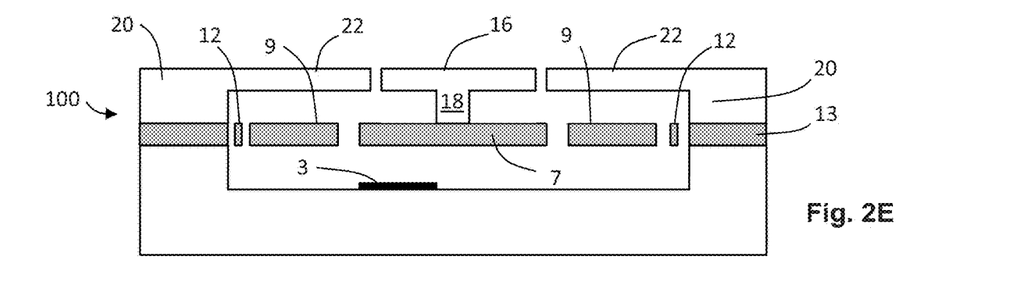

FIGS. 2A-2E illustrate front cross-sectional views, cut along the X axis, of progressive stages of the fabrication process for the MEMS device 100 described in FIGS. 1A-1C. FIG. 2A illustrates etching the mirror 16 backside to create the central pedestal 18 and extensions 20 of the fixed membrane 22. FIG. 2B illustrates bonding the hinge layer 6 beneath the mirror layer 15. FIG. 2C illustrates etching the tilt hinges (see FIG. 1B) and roll hinges 12, the outer gimbal ring 9 and inner gimbal central platform 7 on the bonded mirror and hinge layers. FIG. 2D illustrates bonding the mirror and hinge bonded-pair to a pre-processed electrode layer 2. FIG. 2E illustrates a final release of the three-layer stacked MEMS device 100 in which the mirror 16 is formed in the outer or upper surface of the mirror layer 15 by cutting it away from the fixed membrane 22.

The sequence described above and illustrated in FIGS. 2A-2E is termed reverse bonding because the stacking sequence is in reverse order to standard bonding sequence. It may be noted that hidden hinge MEMS fabrication is difficult with standard bonding sequence as the central mirror platform on electrode layer needs to be released later on by means of an undercutting of a thin oxide that isolates the electrode layer from the substrate. The latter leaves a small gap between the substrate and the electrode anchor post, which has potential concern regarding electrical breakdown voltage. Although a reverse stacking sequence solves some of the issues of bonding onto movable/suspended structures, there remains movable gimbal components during fabrication as described below.

After the third step above, illustrated in FIG. 2C, the inner gimbal central platform 7 is connected to, and rigidly supported by, the central pedestal 18 and the partially-etched mirror layer 15, but the outer gimbal ring 9 is freely suspended between the roll and tilt hinges 12, 8. The outer gimbal ring 9 is not rigidly supported after it has been etched free part way through the fabrication process. Such suspended structures are susceptible to interference or stiction to nearby fixed structures during wet processing such as surface preparation prior to bonding. One risk of damage to the MEMS device 100 is unintended attachment of a suspended structure to other nearby structures; e.g. fusion during high temperature processes such as bond anneal. Yet another risk is possible failure of fragile hinges due to excessive gimbal movement. Therefore, it is highly desirable to restrict movement of suspended structures during fabrication, without impeding the design function of the MEMS device.

Figure 3A:
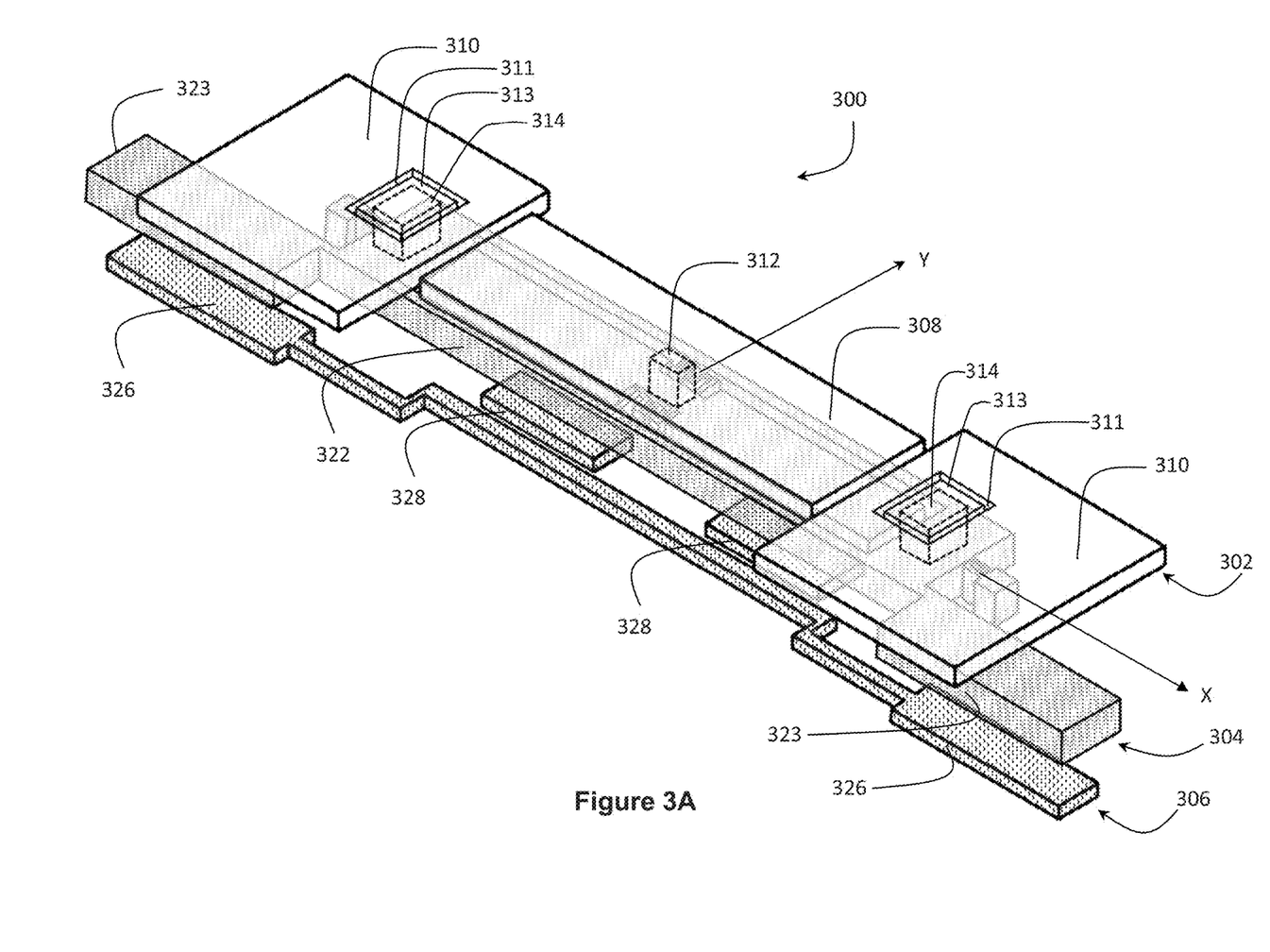
FIG. 3A is an isometric view of a hidden-hinge bi-axial MEMS mirror device according to the present disclosure.
Figure 3B:
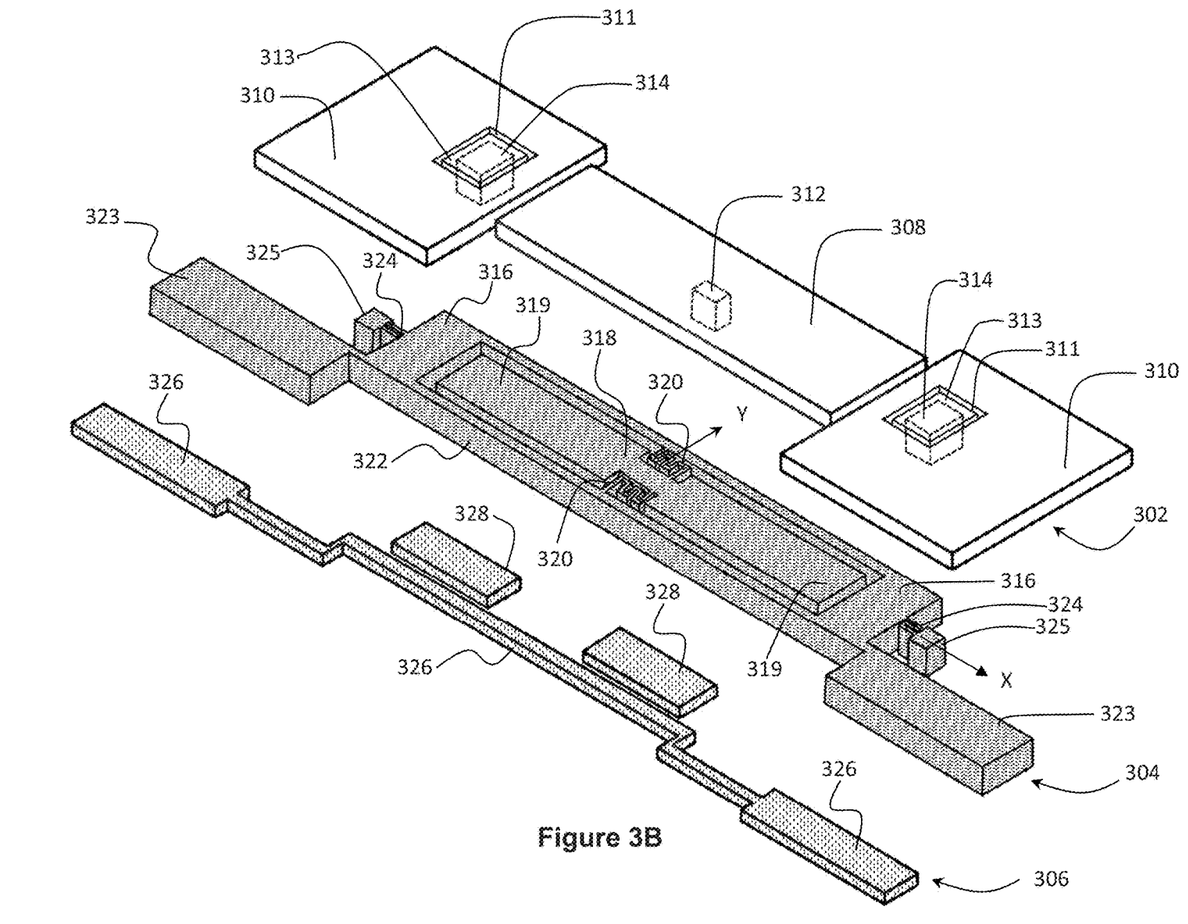
FIG. 3B is a view of the device of FIG. 3A with separated layers.
Figure 3C:
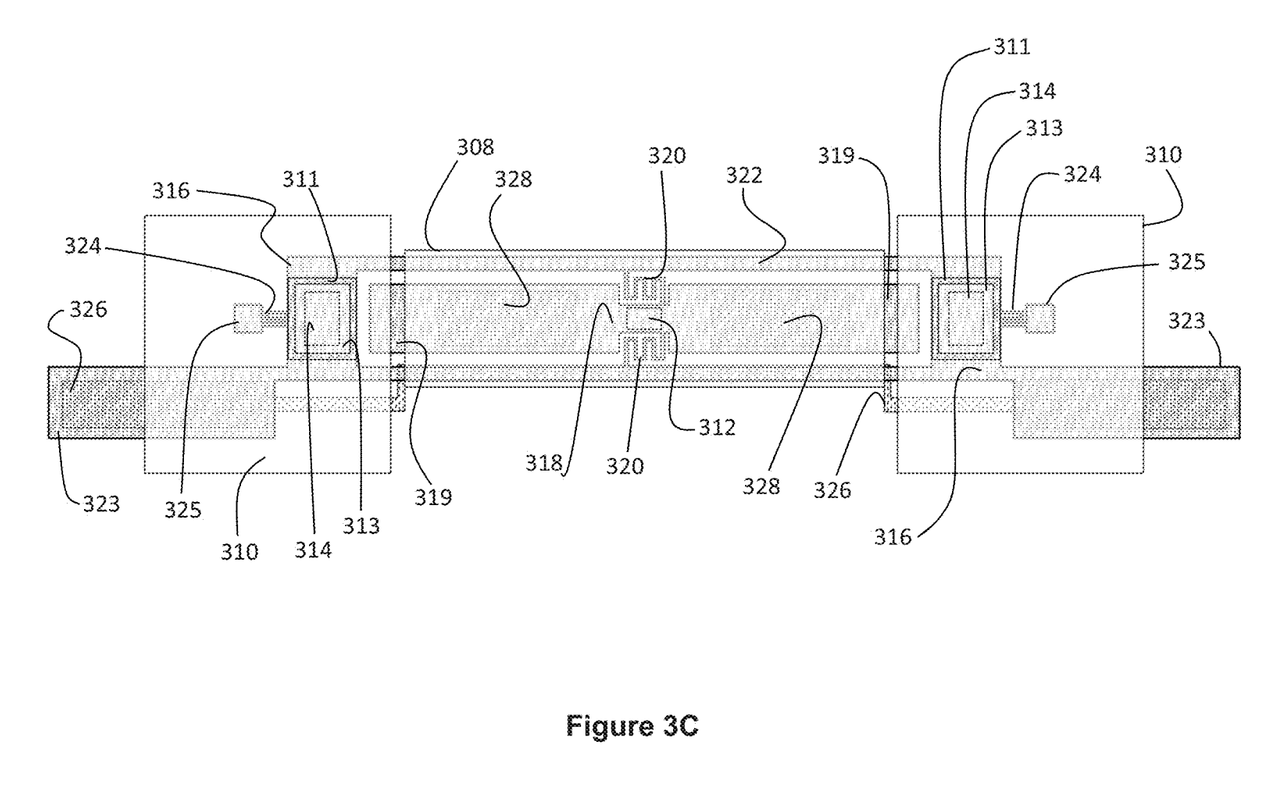
FIG. 3C is a top view of the device of FIG. 3A.
Figure 3D:
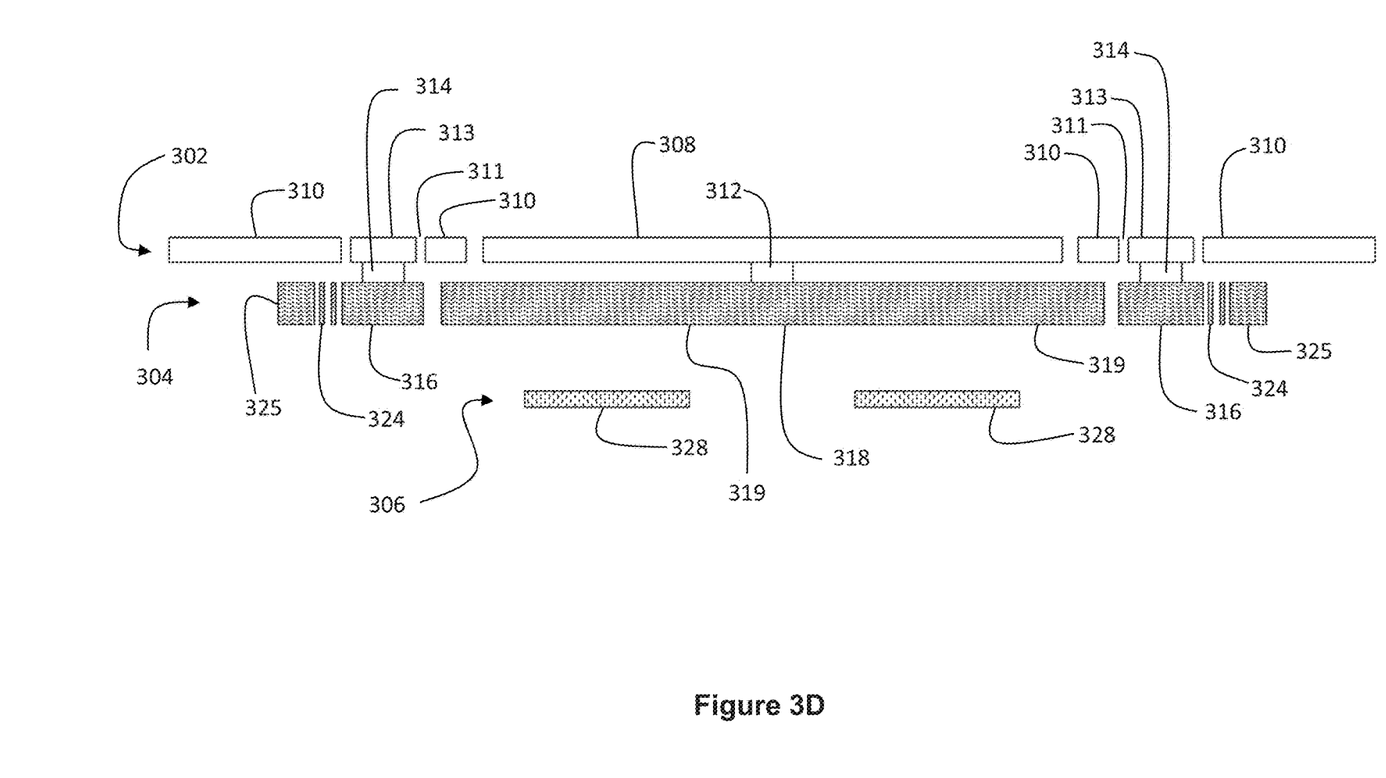
FIG. 3D is a front cross-sectional view, of the device of FIG. 3A, cut along the X axis.
Figure 3E:
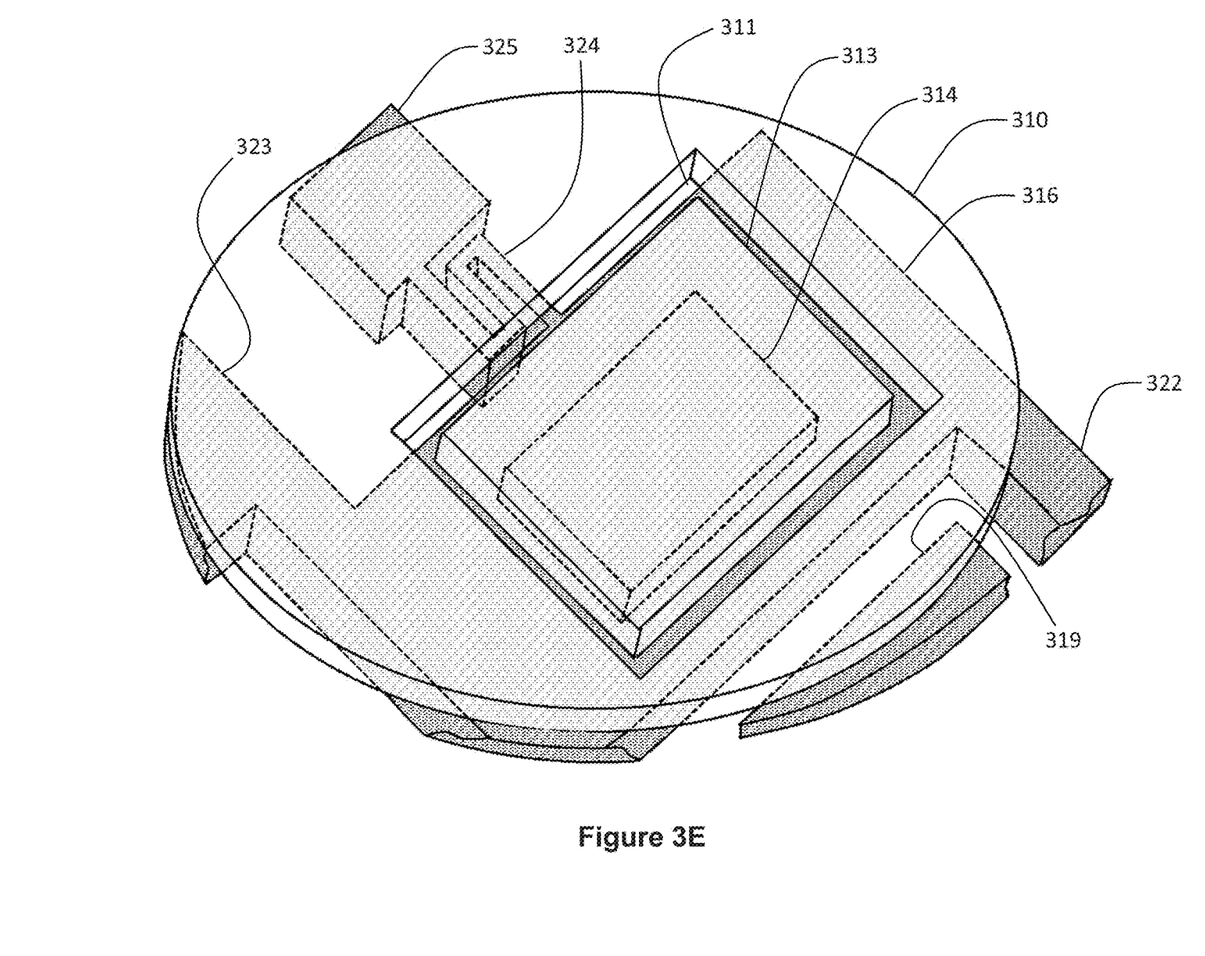
FIG. 3E is an exploded isometric view of an anchor of the device of FIG. 3A.

Turning now to FIGS. 3A-3E collectively, a MEMS device 300 according to the present disclosure is illustrated. FIG. 3A provides an isometric view of the MEMS device 300 where each of the layers are transparent so that the features of all layers are readily visible. FIG. 3B illustrates the MEMS device 300 with each of the three layers separated. FIG. 3C is a top view of the MEMS device, again with transparency. FIG. 3D is a front cross-sectional view cut along the X axis. FIG. 3E is a circularly cut-away exploded isometric view of a released anchor, again with transparency for visibility of features of the lower layers. For simplicity of illustration, base layers, support substrate and mechanical handles commonly employed in multi-layer MEMS devices are generally not illustrated. Such features are well known in the art.

The MEMS device 300 comprises a hidden hinge biaxial MEMS mirror having three layers: an upper-most mirror layer 302, an intermediate hinge layer 304 and a lower electrode layer 306. Each layer and their features are now described.

The mirror layer 302 is the upper-most layer of the MEMS device and the layer upon which light is incident when the MEMS device is in operation. The mirror layer 302 comprises a mirror 308 and fixed membrane 310.

The mirror 308 comprises an upwardly facing reflective surface for reflecting incident light. The mirror 308 is generally a rigid structure because any bending or warping in the mirror affects the precision with which it reflects light along the length of its surface. For hidden-hinge MEMS devices, the mirror 308 extends over top of many of the components of the lower layers such that multiple MEMS mirrors can be arranged in an array and maximize the surface area that provides controllable bidirectional reflection of incident light. The mirror 308 is released from the fixed membrane 310 and supported from below by one or more pedestals 312. The mirror 308 may remain completely or partially connected to the fixed membrane 310 until late in the fabrication process to reduce the number of free moving structures during fabrication.

Fixed membranes 310 are portions of the mirror layer 302 used to support and bond to lower layers of the MEMS device 300. Late in the fabrication process, a gap 311 is defined in the fixed membrane 310 surrounding any temporary anchors 314 securing the outer gimbal platform 322 against unwanted movement during fabrication. Defining gap 311 may cut a cap 313 into the fixed membrane 310 above the temporary anchor 314.

The underside of the mirror 308 is connected to a pedestal 312. The pedestal 312 acts as a support for the mirror 308. The pedestal 312 may be formed in the underside of the mirror layer 302, in the top of the hinge layer 304 or installed between these two layers. FIGS. 3A-3E illustrate a single pedestal 312 centered beneath the mirror 308; however, other numbers of pedestals 312 and locations beneath the mirror 308 are possible. The pedestal 312 may also extend for all or a significant portion of the inner platform 318 and/or mirror 308; however, this has been found undesirable because it may couple any curvature or deformation from the tilt electrodes 328 to the mirror 308 reducing the accuracy of light reflections. This also increases the risk of bond interface stresses affecting the mirror 308. These disadvantages are reduced with a single central pedestal 312 connecting to the active mirror 308.

The underside of fixed membrane 310 is connected to a temporary anchor 314. Each temporary anchor 314 acts as a temporary support during fabrication for the component to which it is connected. In FIGS. 3A-3E, a pair of temporary anchors 314 connect to the outer platform 322, one on each distal end 319 of the outer platform 322 to rigidly connect the outer platform 322 to the underside of the fixed membrane 310 of the mirror layer 302. As illustrated in FIGS. 3A-3E, the MEMS device 300 is in a post-fabrication state where the temporary anchors 314 have already been released when gap 311 was etched into the fixed membrane 310 forming caps 313 on the anchors 314. Gap 311 releases the temporary anchor's rigid connection near the end of the fabrication stage; however, prior to that release step, each temporary anchor 314 rigidly connects the outer platform 322 to the fixed membrane 310.

Temporary anchors 314 overcome the problem of damage to the MEMS device during fabrication experienced in the prior art. For example, comparing to FIGS. 2C-2E where the suspended outer gimbal ring 9 was free to move once the hinge layer 6 was etched, the temporary anchors 314 of the present disclosure rigidly secure the outer platform 322 against such movement during fabrication. Accordingly, suspended structures such as the outer platform 322 are less free to move when temporarily anchored and the damage risks during manufacturing are reduced.

During the final mirror release step, gap 311 is micro-machined around the temporary anchor 314 to free it from the fixed mirror membrane 310. The gap 311 may be designed to have a small area of contact (such as by etching fingers or bumps into the gap 311) to reduce stiction. The gap 311 should be sufficiently large to allow a desired range of angular movement, e.g. 2 um for 3.3° of roll motion. In some embodiments, the gap is about 2 to about 4 um providing about 2° to about 4° of roll motion.

A side benefit of the gap 311 and cap 313 is to provide a hard stop that limits rotation, for example, due to unintended excitation. The gap 311 and the corresponding hard stop are tightly controlled (i.e. self-aligned) because they is fabricated by etching between the moving part (e.g. temporary anchors 314 and cap 313) and the fixed mirror membrane 310 in the same layer. Forming the hard stop from components all in the same layer provides an accurate hard stop for roll rotation because there is no concerns about mask misalignment which would exist in embodiments where the hard stop is formed between different layers. The hard stop may control motion during handling and processing. Alternatively, a significant portion of the mirror layer 302 above the anchors 314 may be etched away, reducing or eliminating cap 313, and removing the possibility of a hard stop limit.

The hinge layer 304 provides the mechanical hinging components necessary to effect the desired angular rotation of the mirror 308 relative to the rest of the MEMS device 300. FIGS. 3A-3E illustrate a concentric biaxial gimbal structure with pairs of coaxially aligned hinges in the hinge layer 304; however other hinge mechanism and single axis structures are also possible. The hinge layer 304 comprises an inner platform 318, tilt hinges 320, an outer platform 322, roll hinges 324 and support membrane 325.

Starting from the outside and working inwardly, the support membrane 325 supports the hinge layer 304 securely between the mirror layer 302 and the electrode layer 306. The support membrane 325 is bonded to or between the fixed membrane 310 or other fixed base or substrate components of the mirror layer 302. The support membrane is also bonded to or between an upper surface of the electrode layer 306 as known in the art.

The roll hinges 324 connect the support membrane 325 to the outer platform 322 and provide a first axis of rotation, roll or X, for the MEMS device 300. In FIGS. 3A-3E, the roll hinges 324 comprise a pair of co-axially aligned piano hinges disposed on opposite distal ends 316 of the outer platform 322. Other hinge mechanisms are equally available based on the desired design.

The outer platform 322 is connected to the support membrane 325 via the roll hinges 324 and rolls about the X axis relative to the support membrane 325. The outer platform 322 comprises a central ring structure surrounding the inner platform 318 and the tilt hinges 320 such that rolling the outer platform 322 also rolls the inner platform 318 and tilt hinges 320. In this manner, the outer platform 322 provides a connective structure for the inner platform 318 and the tilt hinges 320. The outer platform is connected to the inner platform 318 via the tilt hinges 320. As illustrated in FIGS. 3A-3E, the outer platform 322 includes extension platforms 323 disposed at both distal ends 316 of one side of the outer platform 322. The extension platforms 323 assist interaction with the electrode layer 306 to control roll rotation of the MEMS device 300. The distal ends 316 also provide a base on which the anchors 314 may be connected to the outer platform 322.

The tilt hinges 320 connect between the outer platform 322 and the inner platform 318 to provide rotation in a second axis, tilt or Y, orthogonal to the first axis, roll or X. The tilt rotation rotates the inner platform 318 relative to the outer platform 322. In FIGS. 3A-3E, the tilt hinges 320 comprise a pair of piano hinges that are co-axially aligned and connect near a central, tapered or narrowed, position of the inner platform 318. Other hinge mechanisms and placement relative to the inner platform 318 are equally available based on the desired design.

The inner platform 318 is connected to the outer platform 322 via the tilt hinges 320 and to the mirror 308 via the pedestal 312. The inner platform 318 may be an elongate structure that connects to the pedestal 312 in a central, tapered or narrow, position between the tilt hinges 320 with elongate platforms 319 disposed at distal ends of the inner platform 318.

Collectively, the outer platform 322 and roll hinges 324 provide a first gimbal structure while the inner platform 318 and tilt hinges 320 provide a second gimbal structure, orthogonal to the first. In this manner, the components of the hinge layer 304 provides the mirror 308 connected to the inner platform 318 with two degrees of freedom of motion relative to the MEMS device 300.

The electrode layer 306 provides the control mechanisms by which the free moving hinge layer components are controllably angled. The electrode layer 306 is bonded beneath the hinge layer 304. In FIGS. 3A-3E, roll electrodes 326 disposed proximate to the outer platform 322, such as the elongate platforms 323 or the ring structure, electrically control roll rotation of the outer platform 322. Similarly, tilt electrodes 328 disposed proximate to the inner platform 318 electrically control tilt rotation of the inner platform 318. The specific structures and mechanisms for implementing the electrode layer 306 are not essential to embodiments of this disclosure because this invention may be applied to a MEMS device with any angular control mechanism. Any possible implementations of the structures and mechanism by which the electrode layer 306 controls the rotation of the hinge layer components to thereby control rotation of the mirror 308 are permissible. See for example, the electrode layers described in U.S. Pat. Nos. 6,934,439 and 7,616,372 previously identified and incorporated by reference. This includes biaxial and single axis MEMS devices. Embodiments of the invention should not be limited to plate electrodes and/or vertical comb drives in the electrode layer 306 solely because those examples were provided herein.

In operation post-fabrication, the electrode layer 306 controls the roll of the whole gimbal structure and the tilt of the inner platform 318. When the outer platform 322 is rolled along the roll axis through the roll hinges 324, the outer platform 322, inner platform 318, mirror 308 and anchors 314 are rolled relative to the MEMS device 300. The gap 311 permits rolling up to any hard stop limit. When the inner platform 318 is tilted along the tilt axis through the tilt hinges 320, the inner platform 318 and mirror 308 tilt relative to the outer platform 322 and the rest of the MEMS device 300.

The angular position of the central platform 318, and accordingly the mirror 308, can be adjusted according to the amount of voltage, or other electrical characteristics, applied to the tilt electrodes 328 for redirecting a sub-beam of light incident on the mirror 308 to any one of a plurality of output ports, as is well known in the art of optical switching. To prevent the sub-beam from momentarily being transmitted to an output port physically in between the original output port and the new output port, the hot roll electrode 326 is activated to rotate the mirror 308 out of alignment with any of the output ports until the hot tilt electrode 328 is activated to tilt the mirror 308 to the correct angle corresponding with the desired output port. Then the hot roll electrode 326 is deactivated bringing the rolling ground electrode 323 back into the rest position with the tilting ground electrode 319 tilted at the correct angle corresponding to the desired output port. Suitable electrode configurations are disclosed in U.S. Pat. No. 6,968,101 issued Nov. 22, 2005, and U.S. Pat. No. 7,010,188 issued Mar. 7, 2006 both in the name of Miller et al to JDS Uniphase Inc, which are incorporated herein by reference.

A fabrication process will now be described with reference to FIGS. 4A-4E. These figures provide cross-sectional views along the roll axis of a MEMS device 400 at different stages of fabrication. Similar to FIGS. 3A-3E support substrates, bases and handle layers are mostly omitted for simplicity of illustration.

Figure 4A:
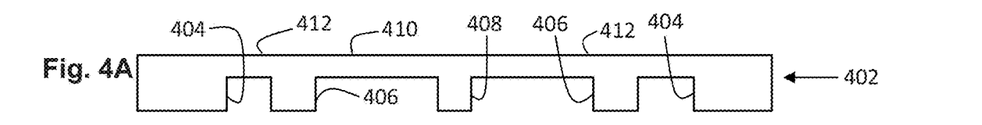
FIGS. 4A-4E are cross-sectional front views of the device of FIG. 3A at different stages of fabrication where the cross-section is taken along the roll axis.

In a first step, the product of which is illustrated in FIG. 4A, the underside of mirror layer 402 is etched forming support membrane 404, anchors 406 and pedestal 408. The top side of the mirror layer 402 is not yet etched, such that the mirror 410 and fixed membrane 412 remain connected. In some embodiments, all or some of the support membrane 404, anchors 406 and pedestal 408 are bonded to the mirror layer instead of etching from the mirror layer underside.

Figure 4B:
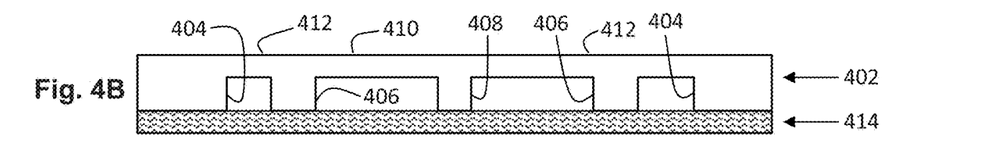
Figure 4C:
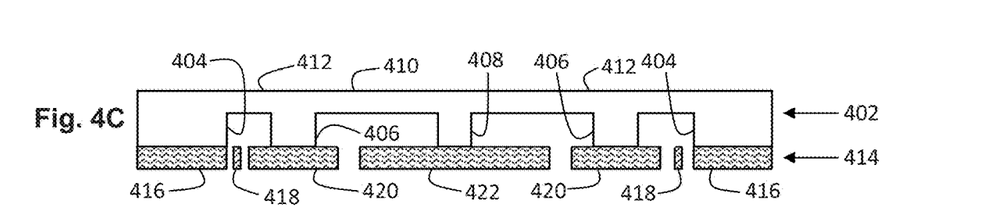

In a next step, a hinge layer 414 is connected, such as by bonding, beneath the mirror layer 304 as illustrated in FIG. 4B.

In a further step, the hinge layer 414 is etched from its underside to define the support membrane 416, roll hinges 418, outer platform 420, tilt hinges (not visible in FIGS. 4A-4E) and inner platform 422. The support membrane 416 is connected beneath the support membrane 404 of the mirror layer and fixes the other components of the hinge layer 414 relative to the mirror layer 402. The roll hinges 418 define the roll axis of rotation. The tilt hinges define the tilt axis of rotation. In combination, the roll hinges 418, outer platform 420, tilt hinges and inner platform 422 operate as a pair of orthogonal gimbals in the manner previously described. However, at this stage of fabrication, the outer platform 420 is connected to the anchors 406 and thus held rigidly in place against rotation.

In comparison to prior art FIG. 2C where the outer platform is freely suspended between the tilt and roll hinges, the outer platform 420 is secured in place at this stage by anchors 406. The inner platform 422 is connected to the pedestal 408 and is held rigidly in place by virtue of the mirror 410 not yet being completely etched or released from the topside of the mirror layer 402.

Figure 4D:
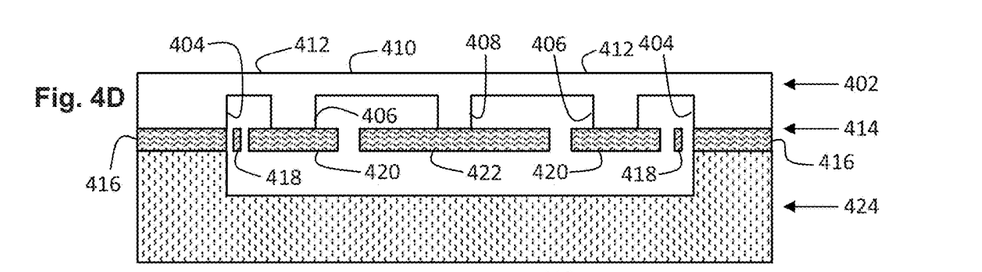
Figure 4E:
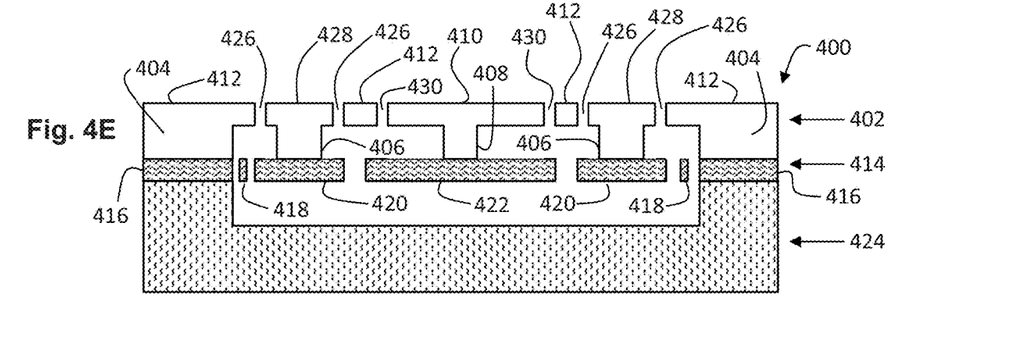

Returning to FIG. 4D, the next stage of the fabrication process involves connecting the electrode layer 424 beneath the hinge layer 414. FIGS. 4D and 4E do not illustrate any particular implementation of electrodes for controlling the hinge layer's tilt and roll because any implementation is possible.

In the final step illustrated in FIG. 4E, the top side of the mirror layer 402 is etched. A gap 430 is etched around the mirror 410 releasing it from the fixed membrane 412. A gap 426 is micro-machined in the fixed membrane 412 around each anchor 406 forming anchor caps 428. The gap 426 should be sufficiently large to allow the desired range of angular movement. For example, 4 um for 3.3° roll motion. A side benefit is that the slot provides a hard stop design to limit roll due to unintended excitation. Alternatively, all or much of the mirror layer 402 above the anchors 406 may be etched away removing the possibility that the freed anchors 406 may limit rotation.

In some embodiments, there may be more than a pair of anchors 314, 406. For example, additional anchors along the tilt axis in the vicinity of the tilt hinges may be added. Typically, the outer platform 322, 420 or outer gimbal ring is too narrow in this area to accommodate these additional anchors; however this may be possible and desirable for relatively large pitch arrays.

Although two anchors provide greater support and symmetrical balance, a single anchor may be sufficiently effect or more anchors may be included. In some embodiments, a single anchor 314, 406 between an otherwise suspended structure and a fixed structure of an upper layer may sufficiently reduce the suspended structure's freedom of movement and reduce the risk of damage during fabrication from moving parts. The single anchor may be located over the axes to balance itself, or the single anchor imbalance maybe offset by other means.

In some embodiments, additional anchors may be provided for other suspended structures such as the inner gimbal central platform. For example, additional anchors may be provided in a region that extends beyond the active mirror area. Anchors may be provided to connect the central platform region that extends beyond the mirror to the fixed membrane, and then freed during the final mirror release step as described above. For example, the inner platform 318, 422 which extends beneath the fixed membrane 310, 412 may be anchored to that fixed membrane 310, 412 allowing the mirror 308, 410 to be released earlier in the fabrication process. These further anchors may be released in the same ways as previously described.

Also within the scope of the present disclosure is to isolate full-stack electrodes by machining a slot around the electrode during the final mirror release step. The reverse stacking sequence does not allow full-stack electrode design unless they are supported by anchors to the mirror layer and isolated in the mirror release step in a similar manner to freeing the anchors 314, 406. This method allows a variety of electrode structures to be fabricated including vertical parallel plate electrodes.

In some embodiments, the mirror layer 402 may have stiffening features such as ribs or bulkheads on its underside extending between the pedestal 312, 408 and the mirror 308, 410, if required. Ideally, a plurality of the MEMS devices 300, 400 are positioned adjacent each other with only a small gap there between for redirecting individual sub-beams from a dispersed beam of light, as disclosed in U.S. Pat. No. 6,934,439 issued Aug. 23, 2005, which is incorporated herein by reference.

In some embodiments, the MEMS device 300, 400 includes only one axis of rotation (tilt or roll, but not both). For a single axis MEMS micro-mirror device, one set of hinges and platform are omitted from the hinge layer. In such one-dimensional MEMS devices, anchors may still be advantageous. For example, if the single platform is released instead of being supported by the pedestal and un-etched mirror layer, anchors could be included. Alternatively, the single platform may be of such a length that additional anchors are advantageous for support. This is especially true where the pedestal is a single central pedestal aligned on the hinge axis and the single platform extends away from the axis a significant distance for the electrode plates. In such an embodiment, the single platform may extend beyond the mirror such that anchors may be provided vertically between the single platform and the fixed membrane. Such anchors may be released later in the fabrication process in the same manners as described above.

Where any claim enumerates elements or actions (alphabetically, numerically or otherwise), these enumerations are provided for identification purposes only and do not imply any order of actions. The order of actions in a claim having enumerated actions (alphabetically, numerically, or otherwise) is determined by the language of the claims as informed by the specification, and not by the enumeration order of those actions.

I claim:

1. A micro-electro-mechanical system (MEMS) device comprising:
   a hinge layer including a fixed membrane having roll hinges connected to an outer platform having tilt hinges connected to an inner platform, the tilt hinges defining an axis of tilt rotation orthogonal to an axis of roll rotation defined by the roll hinges such that the inner platform is provided two degrees of rotational freedom;
   an electrode layer, connected beneath the hinge layer, for receiving electrical control signals, the electrode layer comprising a roll electrode for electrically biasing roll rotation of the outer platform and the inner platform and a tilt electrode for electrically biasing tilt rotation of the inner platform;
   a mirror layer, located above the hinge layer, comprising an outwardly extending mirror, connected to the inner platform via a pedestal, and a fixed membrane connected to the fixed membrane of the hinge layer but detached from the mirror; and
   an anchor,
      wherein a gap is defined between the anchor and the fixed membrane of the mirror layer such that the fixed membrane of the mirror layer is not connected to the outer platform.

2. The MEMS device of claim 1, wherein the gap is defined in the fixed membrane of the mirror layer surrounding the anchor, thereby releasing the anchor and a cap of the fixed membrane of the mirror layer from the fixed membrane of the hinge layer.

3. The MEMS device of claim 2, wherein dimensions of the gap surrounding the anchor define a hard stop limiting roll rotation of the outer platform.

4. The MEMS device of claim 2, wherein the gap is shaped to have a small area of contact between the fixed membrane of the mirror layer, the anchor, and the cap.

5. The MEMS device of claim 1, wherein the anchor comprises a portion of an underside of the mirror layer beneath the fixed membrane of the mirror layer.

6. The MEMS device of claim 1, wherein the anchor connects at a distal end of the outer platform.

7. The MEMS device of claim 1, wherein the outer platform surrounds the inner platform and tilt hinges.

8. The MEMS device of claim 1, wherein the pedestal comprises a portion of an underside of the mirror layer beneath the mirror.

9. The MEMS device of claim 1, wherein the anchor is a first anchor, the gap is a first gap, and the device further comprises:
   a second anchor for further reducing movement of the outer platform,
   wherein the first anchor and the second anchor connect the outer platform to the fixed membrane of the mirror layer proximate to opposite distal ends of the outer platform along the axis of roll rotation, and
   wherein the first gap and a second gap are defined between the anchor and the fixed membrane of the mirror layer such that the fixed membrane of the mirror layer is not connected to the outer platform.

10. A micro-electro-mechanical system (MEMS) device comprising:
   a hinge layer suspended between a mirror layer and an electrode layer,
      the hinge layer comprising a hinge, defining an axis of rotation, and a platform connected to the hinge and rotatable about the axis via the hinge,
      the mirror layer comprising a mirror and a fixed membrane, and
      the electrode layer for receiving electrical signals to control rotation of the platform;
   a pedestal connecting the mirror to the platform; and
   an anchor,
      wherein a gap is defined between the anchor and the fixed membrane such that the fixed membrane is not connected to release the platform.

11. The MEMS device of claim 10, wherein the gap is defined in the fixed membrane surrounding the anchor, thereby releasing the anchor and a cap of the fixed membrane from a membrane of the hinge layer.

12. The MEMS device of claim 11, wherein dimensions of the gap surrounding the anchor define a hard stop limiting roll rotation of the platform.

13. The MEMS device of claim 11, wherein the gap is shaped to have a small area of contact between the fixed membrane, the anchor, and the cap.

14. The MEMS device of claim 10, wherein the anchor comprises a portion of an underside of the mirror layer beneath the fixed membrane.

15. The MEMS device of claim 10, wherein the anchor connects at a distal end of the platform.

16. The MEMS device of claim 10, wherein the platform surrounds an inner platform and tilt hinges.

17. The MEMS device of claim 10, wherein the pedestal comprises a portion of an underside of the mirror layer beneath the mirror.

18. The MEMS device of claim 10, wherein the anchor is a first anchor, the gap is a first gap, and the device further comprises:
   a second anchor.

19. The MEMS device of claim 18, wherein the first anchor and the second anchor connect the platform to the fixed membrane proximate to opposite distal ends of the platform along an axis of roll rotation.

20. The MEMS device of claim 18, wherein
   the first gap and a second gap are defined between the anchor and the fixed membrane such that the fixed membrane is not connected to the platform.

* * * * *